April 2, 1963 W. VAN DEN BUSSCHE 3,084,289
SYNCHRONOUS DEMODULATOR
Filed May 2, 1960
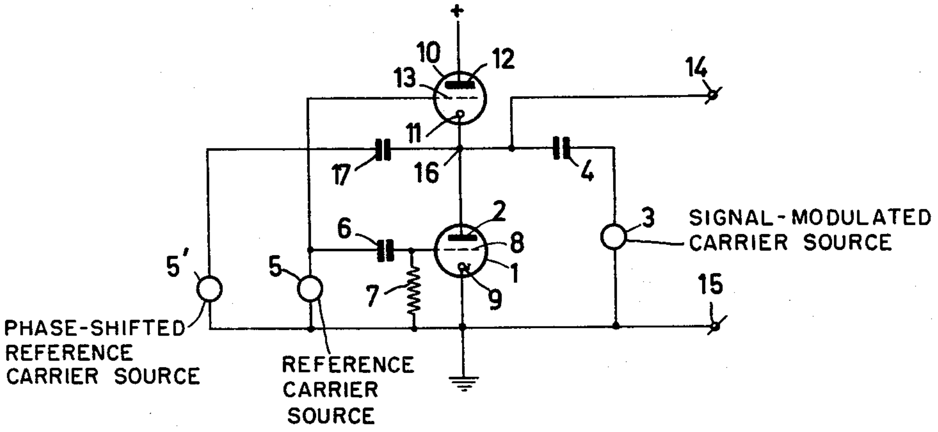
INVENTOR
WILLEM VAN DEN BUSSCHE
BY Frank R. Jifari
AGENT United States Patent Office 3,084,289

Patented Apr. 2, 1963

3,084,289
SYNCHRONOUS DEMODULATOR

Willem van den Bussche, Eindhoven, Netherlands, assignor to North American Philips Company, Inc., New York, N.Y., a corporation of Delaware Filed May 2, 1960, Ser. No. 26,074
Claims priority, application Netherlands May 1, 1959
4 Claims. (Cl. 329—50)

The invention relates to a synchronous demodulator comprising an amplifying valve, preferably a triode, to the anode of which is fed, via a capacitor, a carrier modulated by a signal and to the control-grid of which is fed, also via a capacitor, a reference carrier, which control-grid is connected via a leakage resistor to the cathode of the amplifying valve, the demodulated signal being obtained from the anode.

Synchronous demodulators are used, for example, in receivers for a colour television transmitting system, in which the transmitted signal contains a component consisting of a subcarrier modulated in quadrature by two signals relating to the colour content of a scene.

These known synchronous demodulators have the disadvantage that for the reference carrier the amplifying valve operates as an amplifier, so that the demodulation product contains a considerable amount of the carrier, which can be suppressed only with great difficulty at the output of the demodulator.

Moreover the effect of such a demodulator differs for positive and negative excursions of the signal modulated on the carrier, whilst, in order to obtain an adequate steepness of the positive excursions, the triode requires a high supply voltage.

The invention has for its object to mitigate these disadvantages and the synchronous demodulator according to the invention is characterized in that the anode resistance of the amplifying valve is formed by a second amplifying valve, preferably also a triode, to the control-grid of which is also fed the reference carrier.

The invention will be described more fully with reference to the figure of the drawing.

Reference numeral 1 designates a triode, to the anode 2 of which is fed a signal-modulated carrier from a source 3 via a capacitor 4.

Reference numeral 5 designates the source of the reference carrier. This reference carrier is fed via a capacitor 6 to the control-grid 8 of the triode 1. The control-grid is connected via the leakage resistor 7 to the cathode 9 of the triode 1.

The anode resistance of the triode 1 is formed by the triode 10 having a cathode 11 connected to the anode 2 of the triode 1 and an anode 12 connected to the supply voltage source (not shown).

The reference carrier is moreover, fed to the control-grid 13 of the triode 10.

The output signal of the demodulator is obtained from the terminals 14 and 15. The terminal 15 is connected to ground; the terminal 14 is connected to the junction 16 of the cathode 11 of the triode 10 and the anode 2 of the triode 1.

The time constant of the RC-network 6, 7 is high with respect to the period of the reference carrier. Owing to grid current the capacitor 6 will thus be charged to an extent such that the triode 1 is conductive only during the positive peaks of the reference carrier. The anode current then flowing through the triode 1 will, however, also pass through the triode 10. The junction 16 of the cathode 11 of the triode 10 and the anode 2 of the triode 1 will assume a potential such that during the positive peaks at the control-grid 13 of the triode 10 just this current can be supplied by the triode 10. At all other instants, not coinciding with the occurrence of the positive peaks of the reference carrier the two triodes are blocked and, if the source 3 does not supply a signal, the point 16 will always be at the said potential.

However, when the source 3 supplies a carrier modulated by a signal, the point 16 assumes a voltage, during the blocking time of the triodes, which voltage is the sum of the aforesaid direct-current potential and the voltage supplied by the source 3. At the instant, however, at which the positive peaks of the reference carrier occur, the point 16 is reduced to the aforesaid constant potential, irrespective of the value of the voltage from the source 3.

According as the voltage of the modulated carrier supplied by the source 3 is higher or lower at the said instants than the aforesaid direct-current potential, the charge of the capacitor 4 will be conducted away via the tube 1 or be replenished by the tube 10.

Across the pair of terminals 14, 15 thus occurs, apart from the aforesaid direct-current potential, which is irrelevant in the output product, the product of a modulation signal of the form:

$$\sum_{n=1}^{n=\infty} a_n \cos n\omega t$$

when the reference carrier has the form of $A \cos \omega t$, and of the modulated subcarrier, which has, for example, in the said colour television transmission system, the form $S_1 \cos \omega t + S_2 \sin \omega t$. Apart from higher harmonics, which may be rendered unharmful, if necessary, with the aid of suitable low bandpass filters, this output signal is equal to $\frac{1}{2} a_1 S_1$. The reference carrier itself is not present in this output signal.

If the reference carrier has the form $A \sin \omega t$, the output signal would be equal to $\frac{1}{2} a_1 S_2$; if the reference carrier has the form $A \cos (\omega t + \varphi)$, a linear combination of $S_1$ and $S_2$ is, of course, obtained, $\frac{1}{2} a_1 S_1$ and $\frac{1}{2} a_1 S_2$ are special specimens of such a linear combination.

As stated above, the point 16 will be kept at a constant potential, when the source 3 does not supply a signal. The parasitic capacities between grid and cathode of the triode 10 and between the anode and the grid of the triode 1 may cause the reference carrier to occur to a slight extent at point 16.

This oscillation, which constitutes a local interference, can be suppressed however in a simple manner by supplying, in phase opposition, a reference carrier with a suitably chosen amplitude in a capacitative manner to the point 16. In the figure 5' designates the source, which supplies this reference carrier, of which the phase is shifted over $\pi$ radians relative to the reference carrier supplied by the source 5 via the capacitor 17 to the point 16.

What is claimed is:

1. A synchronous demodulator comprising first and second amplifying devices each having at least a control electrode, a common electrode, and an output electrode, a source of an operating voltage having first and second terminals, means connecting the common electrode of said first device to said first terminal, means connecting the output electrode of said first device to the common electrode of said second device, means connecting the output electrode of said second device to said second terminal, a source of a reference carrier, means having a long time constant with respect to the period of said reference carrier connected to apply said reference carrier between the control electrode and common electrode of said first device, means applying said reference carrier to the control electrode of said second device, a source of modulated oscillations, capacitor means applying said oscillations between the output and common electrodes of said first device, and an output circuit connected to the output electrode of said first device.

2. A synchronous demodulator comprising first and second electron discharge devices each having at least a control grid, a cathode and an anode, a source of operating voltage, means connecting said devices in cascade to said source of voltage, a source of a reference carrier, means applying said reference carrier between the cathode and control grid of said first device comprising means having a long time constant with respect to the period of said reference carrier whereby anode current flows in said first device only during peaks of said reference carrier, means applying said reference carrier to the control grid of said second device, a source of modulated oscillations, capacitor means applying said oscillations between the junction of said devices and a point of fixed potential, and output circuit means connected to said junction.

3. A synchronous demodulator comprising first and second electron discharge devices having first and second control grids, first and second cathodes, and first and second anodes respectively, a source of operating voltage having first and second terminals, means connecting said first cathode to said first terminal, means connecting said first anode to said second cathode, means connecting said second anode to said second terminal, a source of a reference carrier wave having third and fourth terminals, means connecting said third terminal to said first terminal, first capacitor means connected between said fourth terminal and first control grid, a resistor connected between said first grid and first cathode, said resistor and first capacitor having a long time constant with respect to the period of said carrier wave, means connecting said fourth terminal to said second grid, a source of modulated oscillations, second capacitor means connected to apply said oscillations between said first terminal and first anode, and output circuit means connected to said first anode.

4. The demodulator of claim 3, comprising means for providing second carrier oscillations of the frequency of said reference carrier oscillations and having a phase difference of $\pi$ radians with respect thereto, and capacitor means applying said second oscillations between said first terminal and first anode to compensate for reference carrier oscillations appearing at said first anode.

References Cited in the file of this patent

UNITED STATES PATENTS 2,967,237 Schaefer et al. ---------- Jan. 3, 1961

FOREIGN PATENTS 592,835 Great Britain ---------- Sept. 30, 1947